(12) United States Patent
Naserian et al.

(10) Patent No.: US 12,100,301 B2
(45) Date of Patent: Sep. 24, 2024

(54) COOPERATIVE V2X SENSOR SHARING

(71) Applicants: GM Global Technology Operations LLC, Detroit, MI (US); Regents of the University of Michigan, Ann Arbor, MI (US)

(72) Inventors: Mohammad Naserian, Windsor (CA); Fan Bai, Ann Arbor, MI (US); Xumiao Zhang, Ann Arbor, MI (US); Ruiyang Zhu, Ann Arbor, MI (US); Qingzhao Zhang, Ann Arbor, MI (US); Xiao Zhu, Ann Arbor, MI (US); Zhuoqing Morley Mao, Ann Arbor, MI (US)

(73) Assignees: GM GLOBAL TECHNOLOGY OPERATIONS LLC, Detroit, MI (US); REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 328 days.

(21) Appl. No.: 17/844,978

(22) Filed: Jun. 21, 2022

(65) Prior Publication Data
US 2023/0410660 A1    Dec. 21, 2023

(51) Int. Cl.
*G08G 1/16*      (2006.01)
*G01S 17/89*     (2020.01)
(Continued)

(52) U.S. Cl.
CPC .............. *G08G 1/167* (2013.01); *G01S 17/89* (2013.01); *G01S 19/01* (2013.01); *G06F 18/24* (2023.01);
(Continued)

(58) Field of Classification Search
CPC ...... G08G 1/167; G08G 1/0969; G01S 17/89; G01S 19/01; G01S 7/003; G01S 7/4802; G01S 7/4808; G01S 17/931; G06F 18/24; G06T 17/05; G06T 19/20; G06T 2219/2004; H04W 4/44; H04W 4/40; B60R 1/22; B60R 2300/50; G06V 10/764; G06V 10/803; G06V 20/653; G06V 20/58
See application file for complete search history.

(56) References Cited

U.S. PATENT DOCUMENTS

| | | | |
|---|---|---|---|
| 2016/0357187 A1* | 12/2016 | Ansari | G08G 1/165 |
| 2018/0188037 A1* | 7/2018 | Wheeler | G06V 20/582 |
| 2023/0288568 A1* | 9/2023 | Heo | G01S 17/06 |

* cited by examiner

*Primary Examiner* — Joseph H Feild
*Assistant Examiner* — Sharmin Akhter
(74) *Attorney, Agent, or Firm* — Vivacqua Crane, PLLC

(57) ABSTRACT

A system for sharing sensor data between a vehicle and a plurality of remote system generally includes a vehicle communication system, a three-dimensional (3D) sensor, and a controller. The controller is programmed to generate an initial 3D point cloud using the 3D sensor, generate an occupancy grid map based on the initial 3D point cloud, and select a producer remote system to provide data for a cell of the occupancy grid map classified as a first blindspot. The controller is further programmed to send a data request to the producer remote system using the vehicle communication system, receive data from the producer remote system including information about the cell of the occupancy grid map classified as the first blindspot, generate a merged 3D point cloud by merging the data received from the producer remote system with the initial 3D point cloud, and identify objects using the merged 3D point cloud.

20 Claims, 5 Drawing Sheets

(51) Int. Cl.
  *G01S 19/01*    (2010.01)
  *G06F 18/24*   (2023.01)
  *G06T 17/05*    (2011.01)
  *G06T 19/20*    (2011.01)
  *G08G 1/0969*   (2006.01)
  *H04W 4/44*     (2018.01)
(52) U.S. Cl.
  CPC .............. *G06T 17/05* (2013.01); *G06T 19/20* (2013.01); *G08G 1/0969* (2013.01); *H04W 4/44* (2018.02); *G06T 2219/2004* (2013.01)

COOPERATIVE V2X SENSOR SHARING

INTRODUCTION

The present disclosure relates to a system and method for sharing sensor data between a vehicle and one or more remote systems.

To enable the functioning of autonomous driving and/or driver assistive systems, a vehicle must be able to detect and/or measure objects in an environment surrounding the vehicle. Systems and methods have been developed to enable vehicles to gather information about the environment. For example, range-finding sensors such as infrared ranging systems may be used to measure a distance between the vehicle and an object in the environment. The efficacy of range-finding sensor systems may be limited by the geometry of the environment. For example, certain areas of an environment may be occluded by objects which are opaque to range-finding sensors, resulting in blindspots in the vehicle's perception of the environment. To mitigate blindspots, systems and methods have been developed to share sensor data between systems (e.g., between vehicles). However, systems and methods to share sensor data often occupy large bandwidth on communication networks, resulting in reduced efficiency.

Thus, while current systems and methods for sharing sensor data between a vehicle and one or more remote systems achieve their intended purpose, there is a need for a new and improved system and method for sharing sensor data between a vehicle and one or more remote systems.

SUMMARY

According to several aspects, a system for sharing sensor data between a vehicle and a plurality of remote systems is provided. The system includes a vehicle communication system, a three-dimensional (3D) sensor, and a controller in electrical communication with the vehicle communication system and the 3D sensor. The controller is programmed to generate an initial 3D point cloud of an environment surrounding the vehicle using the 3D sensor, where each point in the initial 3D point cloud represents a location of a surface in the environment and has an x, y, and z coordinate relative to the vehicle. The controller is further programmed to generate an occupancy grid map based on the initial 3D point cloud including a cell of the occupancy grid map classified as a first blindspot. The controller is further programmed to select a producer remote system to provide data for the cell of the occupancy grid map classified as the first blindspot. The controller is further programmed to send a data request to the producer remote system using the vehicle communication system based at least on the cell of the occupancy grid map classified as the first blindspot. The controller is further programmed to receive data from the producer remote system including information about the cell of the occupancy grid map classified as the first blindspot. The controller is further programmed to generate a merged 3D point cloud by merging the data received from the producer remote system with the initial 3D point cloud. The controller is further programmed to identify objects in the environment surrounding the vehicle using the merged 3D point cloud.

In another aspect of the present disclosure, to generate the occupancy grid map, the controller is further programmed to classify each point in the initial 3D point cloud as at least one of a ground point or an object point based at least in part on the x, y, and z coordinate of each point. To generate the occupancy grid map, the controller is further programmed to divide the environment surrounding the vehicle into a 2D grid of a plurality of cells, each of the plurality of cells defined by a set of x and y coordinates relative to the vehicle. To generate the occupancy grid map, the controller is further programmed to determine a quantity of ground points having x and y coordinates within the set of x and y coordinates for each of the plurality of cells in the 2D grid and determine a quantity of object points having x and y coordinates within the set of x and y coordinates for each of the plurality of cells in the 2D grid. To generate the occupancy grid map, the controller is further programmed to classify each of the plurality of cells in the 2D grid as a drivable cell, an undrivable cell, or a blindspot cell based at least in part on the quantity of ground points and the quantity of object points having x and y coordinates within the set of x and y coordinates for each of the plurality of cells in the 2D grid. To generate the occupancy grid map, the controller is further programmed to define the occupancy grid map as the 2D grid of the plurality of cells.

In another aspect of the present disclosure, to select the producer remote system, the controller is further programmed to receive, using the vehicle communication system, a plurality of remote occupancy grid maps from the plurality of remote systems, each of the plurality of remote occupancy grid maps including a 2D grid of a plurality of remote cells, each of the plurality of remote cells classified as at least one of a remote drivable cell, a remote undrivable cell and a remote blindspot cell. To select the producer remote system, the controller is further programmed to receive, using the vehicle communication system, a plurality of geographical locations corresponding to each of the plurality of remote systems. To select the producer remote system, the controller is further programmed to identify, for a first blindspot cell of the occupancy grid map, a plurality of potential producer remote systems with information about the first blindspot cell of the occupancy grid map, where the plurality of potential producer remote systems is a subset of the plurality of remote systems. To select the producer remote system, the controller is further programmed to select the producer remote system from the plurality of potential producer remote systems to provide data for the first blindspot cell of the occupancy grid map.

In another aspect of the present disclosure, the system further includes a global navigation satellite system (GNSS). To identify the plurality of potential producer remote systems, the controller is further programmed to determine a geographical location of the vehicle using the GPS. To identify the plurality of potential producer remote systems, the controller is further programmed to determine a cell location for the first blindspot cell of the occupancy grid map using the geographical location of the vehicle and the set of x and y coordinates defining the first blindspot cell of the occupancy grid map. To identify the plurality of potential producer remote systems, the controller is further programmed to determine a plurality of remote cell locations for each remote drivable cell of each of the plurality of remote occupancy grid maps and each remote undrivable cell of each of the plurality of remote occupancy grid maps based on the geographical locations of each of the plurality of remote systems and the set of x and y coordinates defining each of the plurality of remote cells. To identify the plurality of potential producer remote systems, the controller is further programmed to identify the plurality of potential producer remote systems, where the plurality of potential producer remote systems includes a subset of the plurality of remote systems, where the remote occupancy grid map of each of the plurality of potential producer remote systems includes at least one remote drivable cell or remote undrivable cell, and where the remote cell location of the at least one remote drivable cell or remote undrivable cell is the same as the cell location of the first blindspot cell of the occupancy grid map.

In another aspect of the present disclosure, to send the data request to the producer remote system, the controller is further programmed to request data from the producer remote system for at least one remote drivable cell or remote undrivable cell of the remote occupancy grid map.

In another aspect of the present disclosure, to receive data from the producer remote system, the controller is further programmed to receive a remote 3D point cloud from the producer remote system for at least one remote drivable or remote undriveable cell of the remote occupancy grid map.

In another aspect of the present disclosure, to generate the merged 3D point cloud, the controller is further programmed to calculate a time difference between a timestamp of the remote 3D point cloud and a timestamp of the initial 3D point cloud and adjust the x, y, and z coordinates of the remote 3D point cloud based on a velocity of the producer remote system to compensate for the velocity of the producer remote system in response to determining that the time difference is less than a predetermined staleness threshold. To generate the merged 3D point cloud, the controller is further programmed to transform the remote 3D point cloud such that a coordinate origin of the remote 3D point cloud is the same as a coordinate origin of the initial 3D point cloud. To generate the merged 3D point cloud, the controller is further programmed to identify a plurality of overlapping points in the remote 3D point cloud that are expected to have the same x, y, and z coordinates as a plurality of reference points in the initial 3D point cloud based on the plurality of remote cell locations of the remote occupancy grid map from the producer remote system and the plurality of cell locations of the occupancy grid map of the vehicle. To generate the merged 3D point cloud, the controller is further programmed to determine a percentage of the plurality of overlapping points that have the same x, y, and z coordinates as the plurality of reference points in the initial 3D point cloud. To generate the merged 3D point cloud, the controller is further programmed to combine the transformed remote 3D point cloud with the initial 3D point cloud to generate the merged 3D point cloud in response to determining that the percentage of the plurality of overlapping points having the same x, y, and z coordinates as the reference points in the initial 3D point cloud is greater than or equal to a predetermined validity threshold.

In another aspect of the present disclosure, to select the producer remote system, the controller is further programmed to select the producer remote system from the plurality of potential producer remote systems based at least in part on a distance between the vehicle and each of the plurality of potential producer remote systems.

In another aspect of the present disclosure, the controller is further programmed to continuously broadcast the occupancy grid map using the vehicle communication system.

In another aspect of the present disclosure, the controller is further programmed to respond to a remote data request from one of the plurality remote systems by transmitting a 3D point cloud to the remote system using the vehicle communication system.

According to several aspects, a method for sharing sensor data between a vehicle and a plurality of remote systems is provided. The method includes generating an initial 3D point cloud of an environment surrounding a vehicle using a 3D sensor, where each point in the initial 3D point cloud has an x, y, and z coordinate relative to the vehicle. The method also includes generating an occupancy grid map based on the initial 3D point cloud including a first blindspot. The method also includes selecting a producer remote system to provide data for the first blindspot in the occupancy grid map. The method also includes sending a data request to the producer remote system using a vehicle communication system based at least in part on the first blindspot in the occupancy grid map. The method also includes receiving data from the producer remote system including information about the first blindspot in the occupancy grid map. The method also includes generating a merged 3D point cloud by merging the data received from the producer remote system with the initial 3D point cloud. The method also includes identifying objects in the environment surrounding the vehicle using the merged 3D point cloud.

In another aspect of the present disclosure, generating the occupancy grid map further may include classifying each point in the initial 3D point cloud as a ground point or an object point based at least in part on the x, y, and z coordinate of each point. Generating the occupancy grid map further may include dividing the environment surrounding the vehicle into a 2D grid of a plurality of cells, each of the plurality of cells defined by a set of x and y coordinates relative to the vehicle. Generating the occupancy grid map further may include determining a quantity of ground points having x and y coordinates within the set of x and y coordinates for each of the plurality of cells in the 2D grid and determining a quantity of object points having x and y coordinates within the set of x and y coordinates for each of the plurality of cells in the 2D grid. Generating the occupancy grid map further may include classifying each of the plurality of cells in the 2D grid as a drivable cell, an undrivable cell, or a blindspot cell based at least in part on the quantity of ground points and the quantity of object points having x and y coordinates within the set of x and y coordinates for each of the plurality of cells in the 2D grid. Generating the occupancy grid map further may include defining the occupancy grid map as the 2D grid of the plurality of cells.

In another aspect of the present disclosure, classifying each of the plurality of cells in the 2D grid as a drivable cell, an undrivable cell, or a blindspot cell further may include comparing the quantity of ground points in each of the plurality of cells to the quantity of object points in each of the plurality of cells. Classifying each of the plurality of cells in the 2D grid further may include classifying a first cell of the plurality of cells in the 2D grid as a drivable cell in response to determining that the quantity of ground points in the first cell is greater than zero and that the quantity of ground points in the first cell is greater than the quantity of object points in the first cell. Classifying each of the plurality of cells in the 2D grid further may include classifying a second cell of the plurality of cells in the 2D grid as an undrivable cell in response to determining that the quantity of object points in the second cell is greater than zero and that the quantity of object points in the second cell is greater than or equal to the quantity of ground points in the second cell. Classifying each of the plurality of cells in the 2D grid further may include classifying a third cell of the plurality of cells in the 2D grid as a blindspot cell in response to determining that a sum of the quantity of ground points and object points having x and y coordinates within the set of x and y coordinates defining the third cell is less than or equal to a predetermined blindspot threshold.

In another aspect of the present disclosure, selecting the producer remote system further may include receiving, using the vehicle communication system, a plurality of remote occupancy grid maps from the plurality of remote systems, each of the plurality of remote occupancy grid maps including a 2D grid of a plurality of remote cells, each of the plurality of remote cells classified as a remote drivable cell, a remote undrivable cell or a remote blindspot cell. Selecting the producer remote system further may include receiving, using the vehicle communication system, a plurality of geographical locations corresponding to each of the plurality of remote systems. Selecting the producer remote system further may include identifying a plurality of potential producer remote systems with information about a first blindspot cell of the occupancy grid map, where the plurality of potential producer remote systems is a subset of the plurality of remote systems. Selecting the producer remote system further may include selecting the producer remote system from the plurality of potential producer remote systems to provide data for the first blindspot cell of the occupancy grid map based at least in part on a distance between the vehicle and each of the plurality of potential producer remote systems.

In another aspect of the present disclosure, identifying the plurality of potential producer remote systems further may include determining a geographical location of the vehicle using a global navigation satellite system (GNSS). Identifying the plurality of potential producer remote systems further may include determining a cell location for the first blindspot cell of the occupancy grid map using the geographical location of the vehicle and the set of x and y coordinates defining the first blindspot cell of the occupancy grid map. Identifying the plurality of potential producer remote systems further may include determining a plurality of remote cell locations for each remote drivable cell of each of the plurality of remote occupancy grid maps and each remote undrivable cell of each of the plurality of remote occupancy grid maps based on the geographical locations of each of the plurality of remote systems and the set of x and y coordinates defining each of the plurality of remote cells. Identifying the plurality of potential producer remote systems further may include identifying the plurality of potential producer remote systems, where the plurality of potential producer remote systems includes a subset of the plurality of remote systems, where the remote occupancy grid map of each of the plurality of potential producer remote systems includes at least one remote drivable cell or remote undrivable cell, where the remote cell location of the at least one remote drivable cell or remote undrivable cell is the same as the cell location of the first blindspot cell of the occupancy grid map.

In another aspect of the present disclosure, receiving data from the producer remote system further may include receiving a remote 3D point cloud from the producer remote system for at least one remote drivable or remote undriveable cell of the remote occupancy grid map.

In another aspect of the present disclosure, generating the merged 3D point cloud further may include calculating a time difference between a timestamp of the remote 3D point cloud and a timestamp of the initial 3D point cloud. Generating the merged 3D point cloud further may include adjusting the x, y, and z coordinates of the remote 3D point cloud based on a velocity of the producer remote system to compensate for the velocity of the producer remote system in response to determining that the time difference is less than a predetermined staleness threshold. Generating the merged 3D point cloud further may include transforming the remote 3D point cloud such that a coordinate origin of the remote 3D point cloud is the same as a coordinate origin of the initial 3D point cloud. Generating the merged 3D point cloud further may include identifying a plurality of overlapping points in the remote 3D point cloud that are expected to have the same x, y, and z coordinates as a plurality of reference points in the initial 3D point cloud based on the plurality of remote cell locations of the remote occupancy grid map from the producer remote system and the plurality of cell locations of the occupancy grid map of the vehicle. Generating the merged 3D point cloud further may include determining a percentage of the plurality of overlapping points that have the same x, y, and z coordinates as the plurality of reference points in the initial 3D point cloud. Generating the merged 3D point cloud further may include combining the transformed remote 3D point cloud with the initial 3D point cloud to generate the merged 3D point cloud in response to determining that the percentage of the plurality of overlapping points having the same x, y, and z coordinates as the reference points in the initial 3D point cloud is greater than or equal to a predetermined validity threshold.

According to several aspects, a system for sharing sensor data between a vehicle and a plurality of remote systems is provided. The system also includes a vehicle communication system, a global navigation satellite system (GNSS), a three-dimensional (3D) sensor, where the 3D sensor includes at least one of: a lidar sensor and a stereoscopic camera system. The system also includes a controller in electrical communication with the vehicle communication system, the GPS, and the 3D sensor, where the controller is programmed to generate an initial 3D point cloud of an environment surrounding the vehicle using the 3D sensor, where each point in the initial 3D point cloud has an x, y, and z coordinate relative to the vehicle The controller is further programmed to generate an occupancy grid map based on the initial 3D point cloud, where the occupancy grid map represents the environment surrounding the vehicle as a 2D grid of a plurality of cells, each of the plurality of cells defined by a set of x and y coordinates relative to the vehicle. The controller is further programmed to classify each of the plurality of cells in the occupancy grid map as a drivable cell, an undrivable cell, or a blindspot cell based at least in part on the x, y, and z coordinates of a plurality of points in the initial 3D point cloud having x and y coordinates within each of the plurality of cells. The controller is further programmed to select a producer remote system to provide data for a first blindspot cell in the occupancy grid map. The controller is further programmed to send a data request to the producer remote system using the vehicle communication system based at least in part on the first blindspot cell in the occupancy grid map. The controller is further programmed to receive data from the producer remote system including information about the first blindspot in the occupancy grid map. The controller is further programmed to generate a merged 3D point cloud by merging the data received from the producer remote system with the initial 3D point cloud. The controller is further programmed to identify objects in the environment surrounding the vehicle using the merged 3D point cloud.

In another aspect of the present disclosure, to select the producer remote system, the controller is further programmed to receive, using the vehicle communication system, a plurality of remote occupancy grid maps from the plurality of remote systems, each of the plurality of remote occupancy grid maps including a 2D grid of a plurality of remote cells, each of the plurality of remote cells classified as a remote drivable cell, a remote undrivable cell or a remote blindspot cell. To select the producer remote system, the controller is further programmed to receive, using the vehicle communication system, a plurality of geographical locations corresponding to each of the plurality of remote systems. To select the producer remote system, the controller is further programmed to determine a geographical location of the vehicle using the GPS and determine a cell location for the first blindspot cell of the occupancy grid map using the geographical location of the vehicle and the set of x and y coordinates defining the first blindspot cell of the occupancy grid map. To select the producer remote system, the controller is further programmed to determine a plurality of remote cell locations for each remote drivable cell of each of the plurality of remote occupancy grid maps and each remote undrivable cell of each of the plurality of remote occupancy grid maps based on the geographical locations of each of the plurality of remote systems and the set of x and y coordinates defining each of the plurality of remote cells. To select the producer remote system, the controller is further programmed to identify a plurality of potential producer remote systems, where the plurality of potential producer remote systems includes a subset of the plurality of remote systems, where the remote occupancy grid map of each of the plurality of potential producer remote systems includes at least one remote drivable cell or remote undrivable cell, where the remote cell location of the at least one remote drivable cell or remote undrivable cell is the same as the cell location of the first blindspot cell of the occupancy grid map. To select the producer remote system, the controller is further programmed to select the producer remote system from the plurality of potential producer remote systems based at least in part on a distance between the vehicle and each of the plurality of potential producer remote systems.

In another aspect of the present disclosure, the system further includes a human machine interface (HMI), and the controller is further programmed to provide a visual representation of the merged 3D point cloud to an occupant of the vehicle using the HMI.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
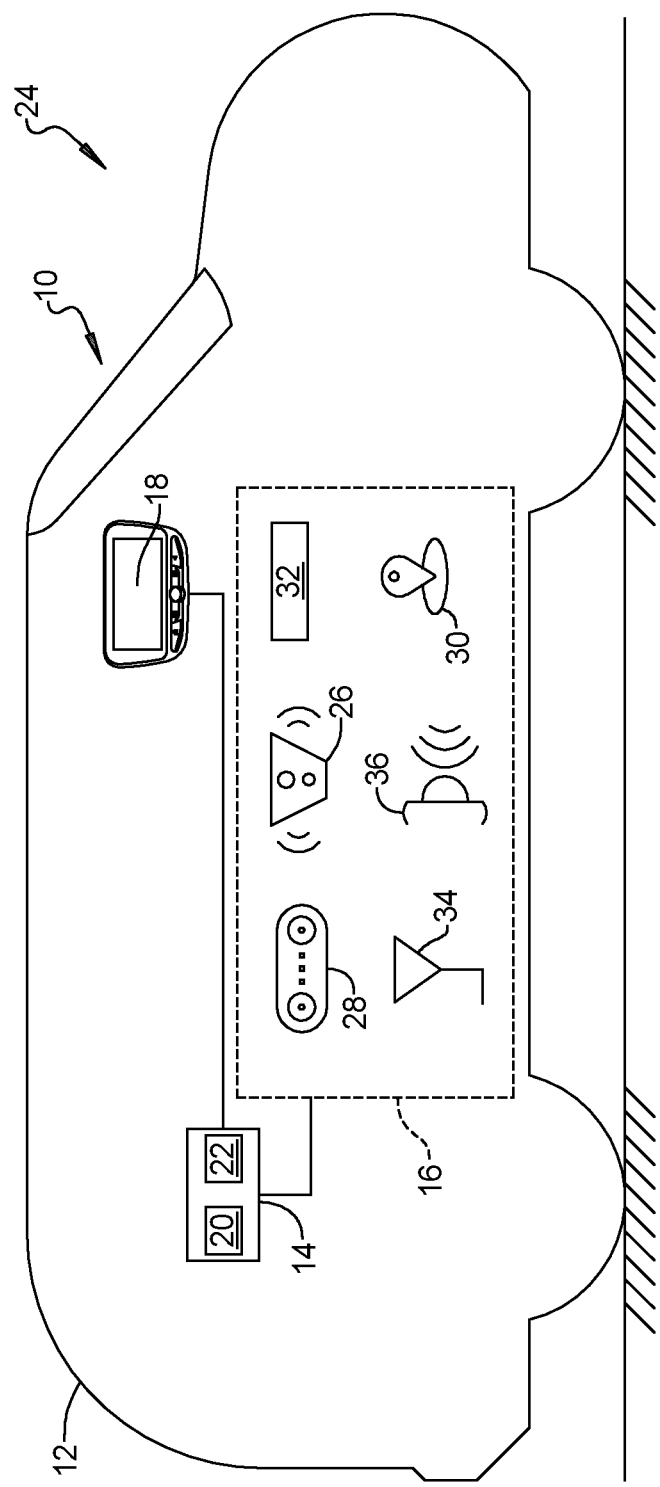
FIG. 1 is a system diagram of a system for sharing sensor data between a vehicle and a plurality of remote systems according to an exemplary embodiment.

Referring to FIG. 1, a system for sharing sensor data between a vehicle and a plurality of remote systems is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of vehicle sensors 16, and a human-machine interface (HMI) 18.

The controller 14 is programmed to implement a method 100 for sharing sensor data between a vehicle and a plurality of remote systems, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and non-volatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the plurality of vehicle sensors 16 and the HMI 18. The electrical communication is established using, for example, a CAN bus, a WiFi network, a cellular data network, or the like. One skilled in the art will appreciate that various additional wired and wireless techniques and communication protocols may be used to communicate with the controller 14.

The plurality of vehicle sensors 16 are used by the controller 14 to gather information about the vehicle 12 and an environment 24 surrounding the vehicle 12. The plurality of vehicle sensors 16 are also used to communicate with systems external to the vehicle 12. In a non-limiting example, the plurality of vehicle sensors 16 includes at least one of a LIDAR system 26 and a stereoscopic camera system 28. The plurality of vehicle sensors 16 additionally includes a global navigation satellite system (GNSS) 30, vehicle systems 32, and a vehicle communication system 34. The vehicle systems 32 provide information such as a vehicle steering angle, vehicle speed, vehicle braking, vehicle heading, vehicle pose (i.e., pitch, yaw, roll), and vehicle acceleration.

The LIDAR system 26 and the stereoscopic camera system 28 are three-dimensional (3D) sensors which are used to determine a distance between the vehicle 12 and objects in the environment 24 surrounding the vehicle 12. One skilled in the art will appreciate that various additional sensors and/or systems may be used to determine the distance between the vehicle 12 and objects in the environment 24 surrounding the vehicle 12.

The vehicle communication system 34 is used by the controller 14 to communicate with other systems. For example, the vehicle communication system 34 includes capabilities for communication with vehicles ("V2V" communication), infrastructure ("V2I" communication), remote systems at a remote call center (e.g., ON-STAR by GENERAL MOTORS) and/or personal devices. In certain embodiments, the vehicle communication system 34 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 34 may include one or more antennas and/or communication transceivers for receiving and/or transmitting signals, such as cooperative sensing messages (CSMs). The vehicle communication system 34 is configured to wirelessly communicate information between the vehicle 12 and another vehicle. Further, the vehicle communication system 34 is configured to wirelessly communicate information between the vehicle 12 and infrastructure or other vehicles. The plurality of vehicle sensors 16 are in electrical communication with the controller 14 as described above.

Figure 2A:
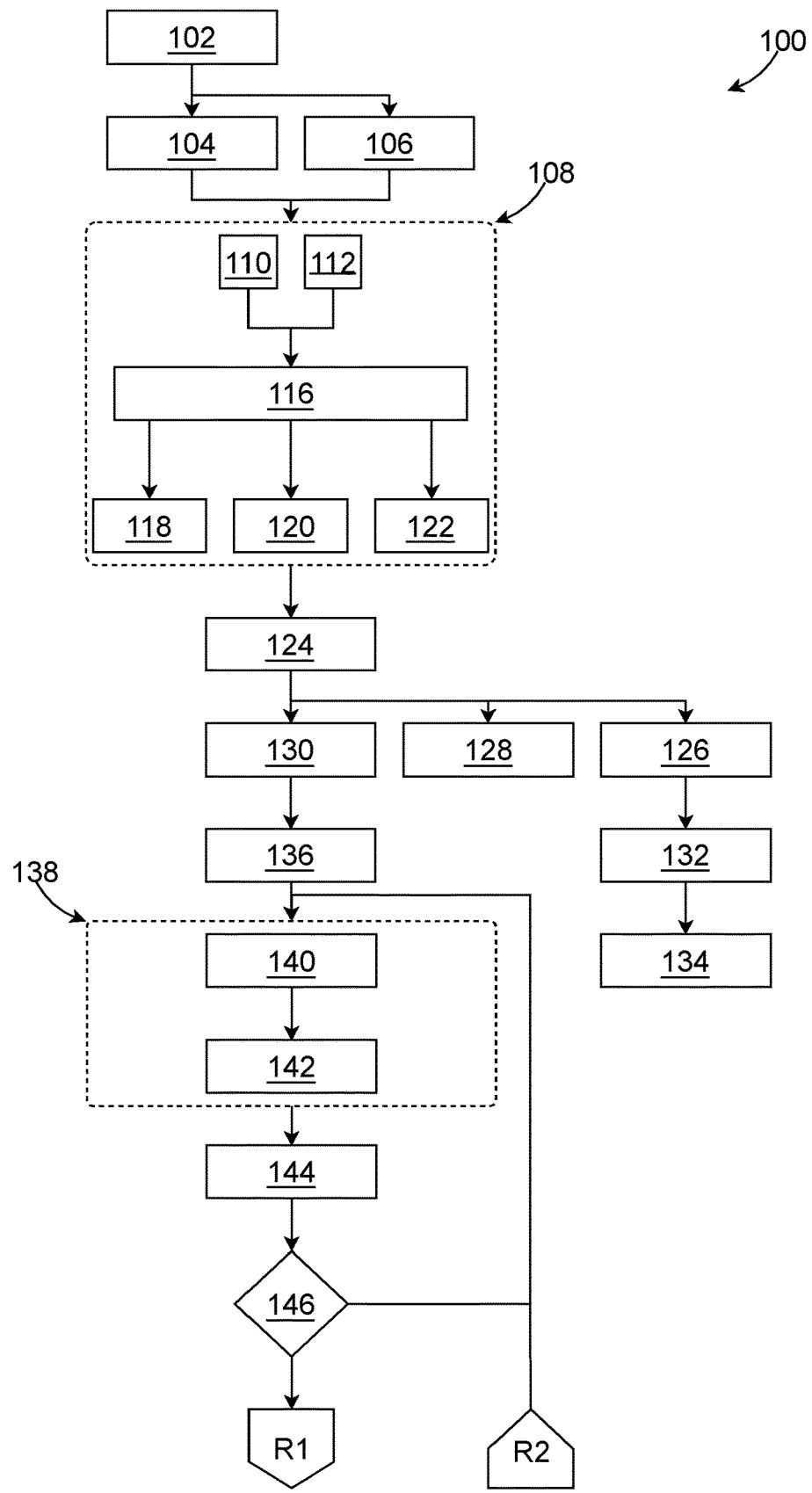
FIG. 2A is a flowchart of a method for sharing sensor data between a vehicle and a plurality of remote systems according to an exemplary embodiment.
Figure 2B:
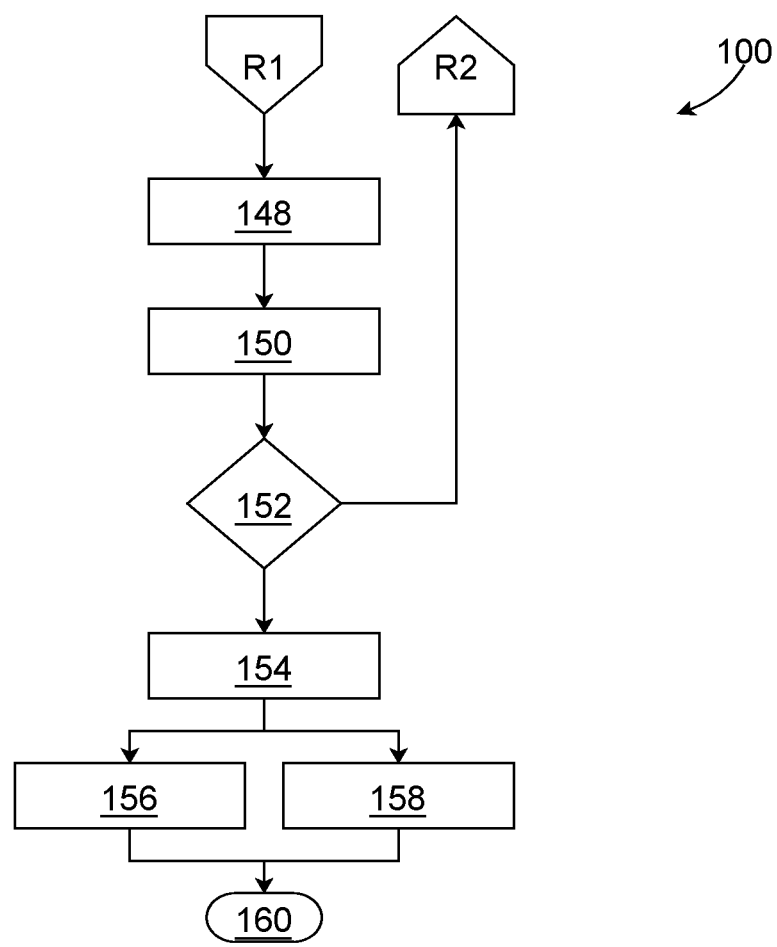
FIG. 2B is a continuation of the flowchart of a method for sharing sensor data between a vehicle and a plurality of remote systems according to an exemplary embodiment.

Referring to FIGS. 2A and 2B, a flowchart of the method 100 for sharing sensor data between a vehicle and a plurality of remote systems is shown. The method 100 begins at block 102.

At block 102, the controller 14 uses a 3D sensor to scan the environment 24 surrounding the vehicle 12. In the exemplary embodiment depicted in FIG. 1, the 3D sensor includes the LIDAR system 26 and/or the stereoscopic camera system 28. The LIDAR system 26 and/or the stereoscopic camera system 28 are used to generate an initial 3D point cloud of the environment 24 surrounding the vehicle 12. Each point in the initial 3D point cloud represents an object or surface detected by the 3D sensor. Each point in the initial 3D point cloud has a corresponding x, y, and z coordinate which defines a position of the point in the environment 24 relative to the vehicle 12. Therefore, the initial 3D point cloud provides information about distances between the vehicle 12 and objects in the environment 24 surrounding the vehicle 12. After block 102, the method 100 proceeds to blocks 104 and 106.

At block 104, each point in the initial 3D point cloud is classified as a ground point or an object point. Ground points are points which are determined to correspond to the ground, for example, a road or other surface upon which the vehicle 12 may drive. Object points are points which are determined to correspond to an object in the environment 24, for example, another vehicle. In a non-limiting example, a machine learning algorithm is used to classify the points. The machine learning algorithm is trained by providing the algorithm with a plurality of 3D point clouds including points which have been pre-classified. For example, the plurality of 3D point clouds may include the results of scans by 3D sensors in various driving environments. After sufficient training of the machine learning algorithm, the algorithm can classify points in 3D scans with a high accuracy and precision. In another non-limiting example, the points in the initial 3D point cloud are classified based on their z coordinate, i.e., the height of each point relative to the vehicle 12. For example, a location of a ground surface relative to the vehicle 12 may be determined based on the size of the vehicle and external inputs, such as information about terrain in the environment 24 surrounding the vehicle 12 provided by the GPS and/or the vehicle communication system 34. Points located at or around the location of the ground surface are classified as ground points, and points located above the location of the ground surface are classified as object points. One skilled in the art will appreciate that various additional methods may be used to classify the points in the initial 3D point cloud.

Figure 3A:
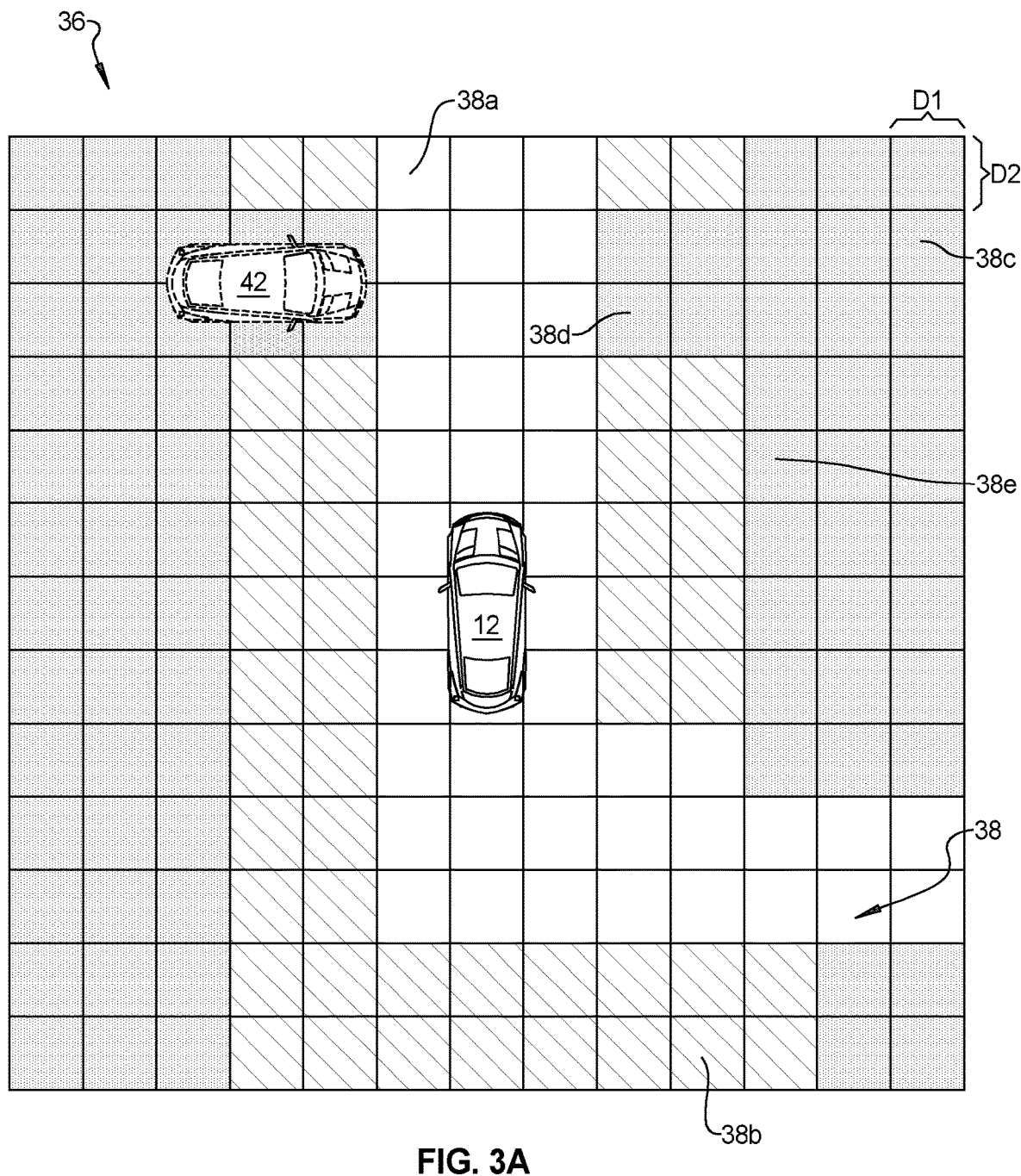
FIG. 3A is an example of an occupancy grid map generated by a vehicle according to an exemplary embodiment.

At block 106, the environment 24 surrounding the vehicle 12 is divided into an occupancy grid map. The process of block 106 is best understood by referring to FIG. 3A, which shows an exemplary occupancy grid map 36 generated by controller 14 at block 106. The occupancy grid map 36 is a 2D grid of a plurality of cells 38, each of the plurality of cells 38 including a set of x and y coordinates. Thus, each cell 38 in the occupancy grid map 36 corresponds to one or more points in the initial 3D point cloud which have x and y coordinates within the set of x and y coordinates defining the cell 38. Each of the plurality of cells 38 has a length D1 and a width D2. In an exemplary embodiment, D1 and D2 are both one meter. The size of the occupancy grid map 36 may be predetermined or may be dynamically determined based on various factors such as, for example, vehicle speed, vehicle size, and vehicle stopping distance. After block 106, the method 100 proceeds to a first sub-process 108.

At the first sub-process 108, each cell 38 of the occupancy grid map 36 is classified as a drivable cell 38a, an undrivable cell 38b, or a blindspot cell 38c. The following steps (blocks 110-122) are repeated for each of the plurality of cells 38 in the occupancy grid map 36 during the first sub-process 108.

At block 110, a quantity of ground points in the cell 38 is determined. As discussed above, the cell 38 in the occupancy grid map 36 corresponds to one or more points in the initial 3D point cloud which have x and y coordinates within the set of x and y coordinates defining the cell 38. Additionally, each point in the initial 3D point cloud has been classified as a ground point or an object point at block 104. Therefore, the quantity of ground points in the cell 38 may be determined. At block 112, a quantity of object points in the cell 38 is determined. The first sub-process 108 then proceeds to block 116.

At block 116, the cell 38 is classified as a drivable cell 38a, an undrivable cell 38b, or a blindspot cell 38c. Drivable cells 38a represent areas in the environment 24 where the vehicle 12 may drive without colliding with an object, for example, an empty road. Undrivable cells 38b represent areas in the environment 24 where the vehicle 12 may not drive because of an object, for example, a parked vehicle located on a side of a road. Blindspot cells 38c represent areas in the environment 24 for which the controller 14 does not have sufficient data to determine whether the vehicle 12 may safely drive in the area. For example, blindspot cells 38c may occur because areas of the environment 24 are obstructed by structures which are not transparent to the 3D sensor (LIDAR system 26 and/or stereoscopic camera system 28) of the vehicle 12. In another example, the 3D sensor of the vehicle 12 may have a maximum range which is smaller than the size of the occupancy grid map 36. Thus, cells 38 which are located outside of the maximum range of the 3D sensor are classified as blindspot cells 38c. To classify the cell 38, the quantity of ground points in the cell 38 determined at block 110 is compared to the quantity of object points in the cell 38 determined at block 112. If the quantity of ground points is greater than zero and the quantity of ground points is greater than the quantity of object points, the first sub-process 108 proceeds to block 118. At block 118, the cell 38 is classified as a drivable cell 38a. If the quantity of object points is greater than zero and the quantity of object points is greater than or equal to the quantity of object points, the first sub-process 108 proceeds to block 120. At block 120, the cell 38 is classified as an undrivable cell 38b. If the cell 38 contains a total number of ground points and object points which is less than or equal to a predetermined blindspot threshold, the first sub-process 108 proceeds to block 122. At block 122, the cell 38 is classified as a blindspot cell 38c.

As discussed above, the first sub-process 108 is repeated for each of the plurality of cells 38 of the occupancy grid map 36. The result of the first sub-process 108 is the occupancy grid map 36 shown in FIG. 3A, where each of the plurality of cells 38 of the occupancy grid map 36 is classified as a drivable cell 38a, an undrivable cell 38b, or a blindspot cell 38c. After the first sub-process 108 is repeated for each of the plurality of cells 38 of the occupancy grid map 36, the method 100 proceeds to block 124.

At block 124, a geographical location in the environment 24 is determined for each cell 38 using the GPS 30 and based on the set of x and y coordinates which define each cell 38 relative to the vehicle 12. After block 124, the method 100 proceeds to blocks 126, 128, and 130.

Figure 3B:
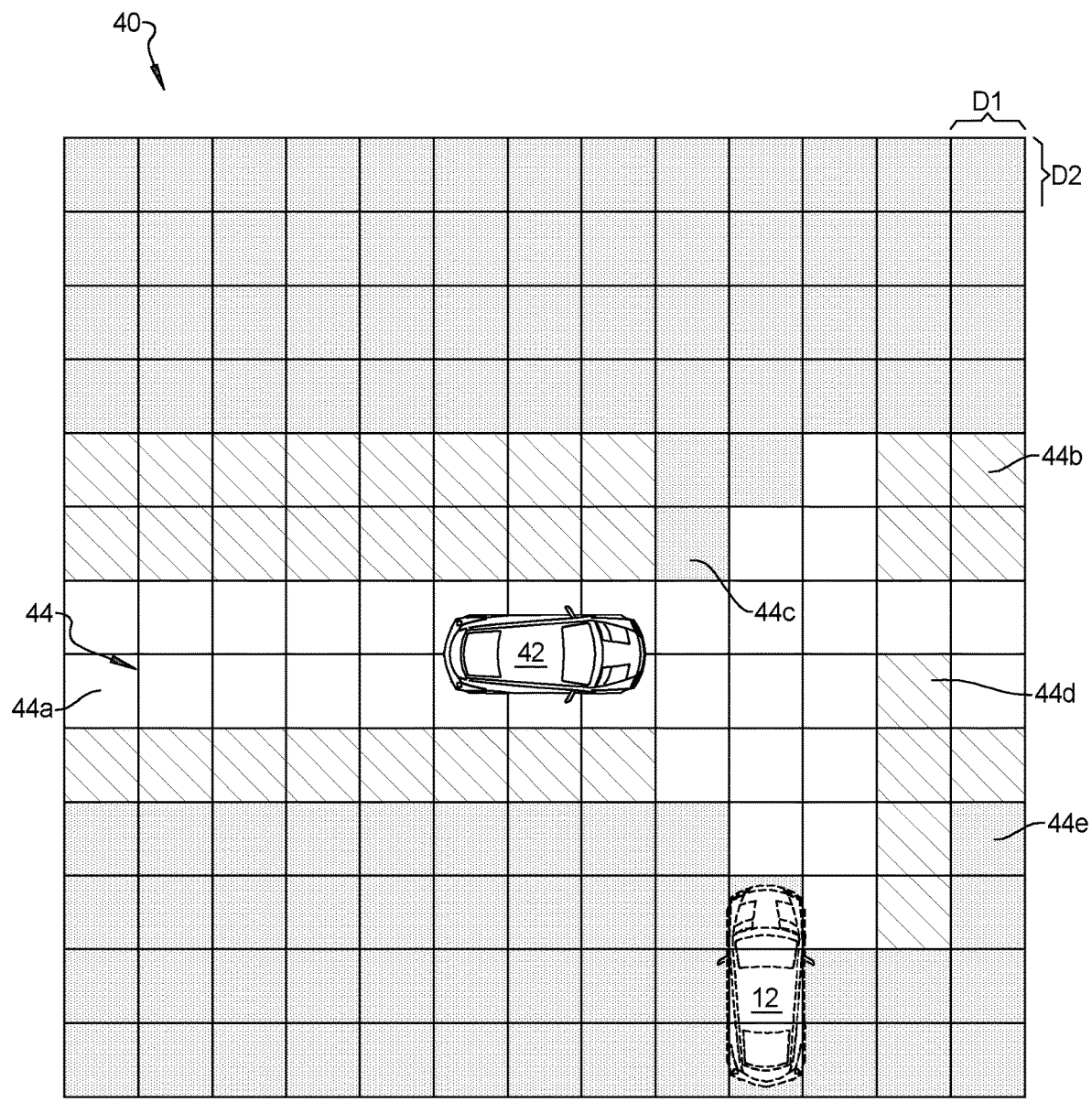
FIG. 3B is an example of an occupancy grid map generated by a remote vehicle according to an exemplary embodiment.

At block 126, a data request from a remote system is received. In an exemplary embodiment, the remote system is a remote vehicle in the vicinity of the vehicle 12. FIG. 3B shows an exemplary remote occupancy grid map 40 generated by an exemplary remote vehicle 42. The remote occupancy grid map 40 includes a plurality of remote cells 44 classified as remote drivable cells 44a, remote undrivable cells 44b, and remote blindspot cells 44c. In another exemplary embodiment, the remote system also includes stationary infrastructure installed near a roadway, for example, a sensing station mounted on a pole near an intersection of the roadway. The data request includes one or more cells of the occupancy grid map 36 of the vehicle 12 for which data is requested by the remote system. In a non-limiting example, the remote system is the remote vehicle 42. The remote vehicle 42 generates a data request based on a geographical location of remote blindspot cells 44c in the remote occupancy grid map 40 as determined by a GPS system of the remote vehicle 42. In an exemplary embodiment shown in FIGS. 3A and 3B, the remote occupancy grid map 40 of the remote vehicle 42 contains at least one remote blindspot cell 44c. The remote vehicle 42 may send a data request for data regarding the corresponding cell 38a in the occupancy grid map 36 of the vehicle 12. After block 130, the method 100 proceeds to block 132.

At block 132, the initial 3D point cloud generated at block 102 is partitioned based on the data request received at block 130. The points are selected which have x and y coordinates within the set of x and y coordinates defining the cells in the data request received at block 130. In the exemplary embodiment shown in FIGS. 3A and 3B, all points are selected which have x and y coordinates within cell 38a. After block 132, the method 100 proceeds to block 134.

At block 134, a partitioned 3D point cloud containing only the points selected at block 132 is transmitted using the vehicle communication system 34 to the remote system which sent the data request received at block 130. In the exemplary embodiment shown in FIGS. 3A and 3B, the remote system is the remote vehicle 42. Thus, the partitioned 3D point cloud is transmitted by controller 14 of the vehicle 12 to the remote vehicle 42.

At block 128, the controller 14 uses the vehicle communication system 34 to broadcast the occupancy grid map 36, location of the vehicle 12, and a timestamp to remote systems, including remote vehicles or stationary infrastructure as discussed above.

At block 130, a plurality of remote occupancy grid maps 40, remote system locations, and timestamps are received from a plurality of remote systems using the vehicle communication system 34. In an exemplary embodiment, the plurality of remote systems may include remote vehicles 42 and/or stationary infrastructure installed near a roadway. In a non-limiting example, there are a plurality of remote systems transmitting remote occupancy grid maps 40 which are received by controller 14 of the vehicle 12 using the vehicle communication system 34 and stored in the media 22 of the controller 14. After block 130, the method 100 proceeds to block 136.

At block 136, a geographical location in the environment 24 is determined for each of the plurality of remote cells 44 of the plurality of remote occupancy grid maps 40 received at block 130. The geographical location of each of the plurality of remote cells 44 is determined based on the geographical location of each of the plurality of remote systems received at block 130 and based on the set of x and y coordinates which define each of the plurality of remote cells 44 of the plurality of remote occupancy grid maps 40 relative to the geographical location of each of the plurality of remote systems. After block 136, the method 100 proceeds to a second sub-process 138.

At the second sub-process 138, a producer remote system is selected for each blindspot cell 38c of the occupancy grid map 36. The following steps (blocks 140-142) are repeated for each of the plurality of blindspot cells 38c in the occupancy grid map 36 during the second sub-process 138.

At block 140, a plurality of potential producer remote systems is identified from the plurality of remote systems. The plurality of potential producer remote systems is identified based on the geographical location in the environment 24 determined for the blindspot cell 38c of the occupancy grid map 36 at block 124. The plurality of potential producer remote systems is a subset of the plurality of remote systems from which the plurality of remote occupancy grid maps and remote system locations were received at block 130. In a non-limiting example, the plurality of remote systems may include remote vehicles 42 and/or stationary infrastructure installed near a roadway. More specifically, the plurality of potential producer remote systems are those remote systems having remote occupancy grid maps 40 including remote drivable cells 44a or remote undrivable cells 44b corresponding to the geographical location of the blindspot cell 38c of the occupancy grid map 36 of the vehicle 12. In the exemplary embodiment of FIGS. 3A and 3B, the blindspot cell 38d in the occupancy grid map 36 of the vehicle 12 is at the same geographical location as the remote undrivable cell 44*d* in the remote occupancy grid map 40 of the remote vehicle 42. Therefore, the remote vehicle 42 is selected as a potential producer remote system for the blindspot cell 38*d* because the remote vehicle 42 has data about the blindspot cell 38*d*. The blindspot cell 38*e* in the occupancy grid map 36 of the vehicle 12 is at the same geographical location as the remote blindspot cell 44*e* in the remote occupancy grid map 40 of the remote vehicle 42. Therefore, the remote vehicle 42 is not selected as a potential producer remote system for the blindspot cell 38*e* because the remote vehicle 42 does not have data about the blindspot cell 38*e*. After block 140, the second sub-process 138 proceeds to block 142.

At block 142, a producer remote system for the blindspot cell 38*c* is selected from the set of potential producer remote systems identified at block 140. In a non-limiting example, there may be a plurality of potential producer remote systems with data about the blindspot cell 38*c*. Therefore, it is necessary to select a producer remote system from the set of potential producer remote systems from which the data for the blindspot cell 38*c* will be requested. In an exemplary embodiment, the producer remote system is selected based on a distance between the vehicle 12 and each of the plurality of potential producer remote systems. The potential producer remote system which is closest to the vehicle 12 is selected to maximize data quality. One skilled in the art will appreciate that various additional methods may be used to select the producer remote system from the set of potential producer remote systems.

As discussed above, the second sub-process 138 is repeated for each blindspot cell 38*c* of the occupancy grid map 36. In an exemplary embodiment, the result of the second sub-process 138 is a plurality of producer remote systems, one for each blindspot cell 38*c* of the occupancy grid map 36. In another exemplary embodiment, the plurality of potential producer remote systems may not include a valid producer remote system for each blindspot cell 38*c* of the occupancy grid map 36. After the second sub-process 138, the method 100 proceeds to block 144.

At block 144, the controller 14 uses the vehicle communication system 34 to request data from the plurality of producer remote systems selected at the second sub-process 138. In an exemplary embodiment, the plurality of producer remote systems includes the remote vehicle 42. The data request includes an identification of one or more cells 44 of the occupancy grid map 40 of the remote vehicle 42 for which data is requested by controller 14 of the vehicle 12. The remote vehicle 42 responds to the data request with a partitioned 3D point cloud including only the points which have x and y coordinates within the set of x and y coordinates defining the cells 44 in the data request as discussed above in reference to blocks 132 and 134. The partitioned 3D point cloud is transmitted along with a timestamp, such that the controller 14 of the vehicle 12 can determine when the points in the partitioned 3D point cloud were measured. In a non-limiting example, data is requested only for cells 38 in the occupancy grid map 36 which are classified as blindspot cells 38*c*, thereby reducing data traffic. The data received at block 144 is called a remote 3D point cloud. After block 144, the method 100 proceeds to block 146.

At block 146, a time difference is calculated between the timestamp received at block 144 and a current time as determined by the controller 14. If the time difference is greater than or equal to a predetermined staleness threshold, the remote 3D point cloud received at block 144 is determined to be too old, and the method 100 returns to the second sub-process 138 for selection of another producer remote system. If the time difference is less than to the predetermined staleness threshold, the method 100 proceeds to block 148 in FIG. 2B.

At block 148, the remote 3D point cloud received at block 144 is transformed into the coordinate system of the vehicle 12. The transformation process may consist of translation and/or rotation operations such that the remote 3D point cloud is transformed from the perspective of the producer remote system to the perspective of the vehicle 12. In an exemplary embodiment, the remote 3D point cloud is transformed such that a coordinate origin of the remote 3D point cloud is the same as a coordinate origin of the initial 3D point cloud generated at block 102. In another exemplary embodiment, the remote 3D point cloud may additionally be adjusted to compensate for a velocity of the producer remote system which supplied the remote 3D point cloud. The result of transformation at block 148 is a transformed remote 3D point cloud. After block 148, the method 100 proceeds to block 150.

At block 150, a plurality of overlapping points is identified in the transformed remote 3D point cloud. Overlapping points are points which are expected to have the same x, y, and z coordinates as reference points in the initial 3D point cloud generated at block 102. For example, a set of reference points contained within a one by one by one meter cube centered at x=2, y=3, z=1 in the initial 3D point cloud are expected to match with a set of overlapping points in the same location in the transformed remote 3D point cloud, assuming that data for that location is available in both the initial 3D point cloud and the transformed remote 3D point cloud. After identifying the overlapping points at block 150, the method 100 proceeds to block 152.

At block 152, the overlapping points in the transformed remote 3D point cloud are compared the reference points in the initial 3D point cloud. If a percentage of the overlapping points having the same x, y, and z coordinates as the reference points is less than a predetermined validity threshold, the method 100 returns to the second sub-process 138. If the percentage of the overlapping points having the same x, y, and z coordinates as the reference points is greater than or equal to the predetermined validity threshold, the method 100 proceeds to block 154.

Blocks 150 and 152 are a validity check of the received remote 3D point cloud. The validity check prevents data from malfunctioning or malicious remote systems from being used in the method 100. If invalid data is repeatedly received from a specific remote system, the controller 14 may configure the vehicle communication system 34 to prevent future connection to the specific remote system.

At block 154, the transformed remote 3D point cloud is combined with the initial 3D point cloud to generate a merged 3D point cloud. To combine the 3D point clouds, the transformed remote 3D point cloud is stacked on the initial 3D point cloud, such that the merged 3D point cloud contains all the points from both the initial 3D point cloud and the transformed remote 3D point cloud. After block 154, the method 100 proceeds to blocks 156 and 158.

At block 156, the merged 3D point cloud is analyzed and action is taken based on results of the analysis. In an exemplary embodiment, object detection is performed using the merged 3D point cloud to identify objects in the environment 24. For example, the vehicle 12 can identify an obstruction located at blindspot cell 38*d* using data provided by the remote vehicle 42 from the remote undrivable cell 44*d*. Various actions may be taken based on the object detection, for example, altering a route of the vehicle 12, notifying a driver of the vehicle 12, and/or performing an accident avoidance operation (i.e., automatic emergency braking).

At block 158, a visualization of the merged 3D point cloud is displayed to occupants of the vehicle 12 using the HMI 18. In an exemplary embodiment, the vehicle 12 is a fully autonomous vehicle, and the visualization increases occupant comfort by visualizing the vehicle's awareness of the environment 24. In another exemplary embodiment, the vehicle 12 is driven by a driver, and the visualization assists the driver by increasing driver awareness of the environment 24. After blocks 156 and 158, the method 100 enters a standby state at block 160.

The system and method of the present disclosure offer several advantages. These include allowing cooperative data sharing while reducing network traffic by sending only required data. By sharing only data required to fill blindspots instead of full frames of data, network bandwidth is preserved. By merging received shared data with data gathered by the vehicle, more complete and accurate perception of the environment is achieved, increasing occupant safety.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for sharing sensor data between a vehicle and a plurality of remote systems, the system comprising:
   a vehicle communication system;
   a three-dimensional (3D) sensor; and
   a controller in electrical communication with the vehicle communication system and the 3D sensor, wherein the controller is programmed to:
      generate an initial 3D point cloud of an environment surrounding the vehicle using the 3D sensor, wherein each point in the initial 3D point cloud represents a location of a surface in the environment and has an x, y, and z coordinate relative to the vehicle;
      generate an occupancy grid map based on the initial 3D point cloud including a cell of the occupancy grid map classified as a first blindspot;
      select a producer remote system to provide data for the cell of the occupancy grid map classified as the first blindspot;
      send a data request to the producer remote system using the vehicle communication system based at least on the cell of the occupancy grid map classified as the first blindspot;
      receive data from the producer remote system including information about the cell of the occupancy grid map classified as the first blindspot;
      generate a merged 3D point cloud by merging the data received from the producer remote system with the initial 3D point cloud; and
      identify objects in the environment surrounding the vehicle using the merged 3D point cloud.

2. The system of claim 1, wherein to generate the occupancy grid map the controller is further programmed to:
   classify each point in the initial 3D point cloud as at least one of a ground point or an object point based at least in part on the x, y, and z coordinate of each point;
   divide the environment surrounding the vehicle into a 2D grid of a plurality of cells, each of the plurality of cells defined by a set of x and y coordinates relative to the vehicle;
   determine a quantity of ground points having x and y coordinates within the set of x and y coordinates for each of the plurality of cells in the 2D grid;
   determine a quantity of object points having x and y coordinates within the set of x and y coordinates for each of the plurality of cells in the 2D grid;
   classify each of the plurality of cells in the 2D grid as a drivable cell, an undrivable cell, or a blindspot cell based at least in part on the quantity of ground points and the quantity of object points having x and y coordinates within the set of x and y coordinates for each of the plurality of cells in the 2D grid; and
   define the occupancy grid map as the 2D grid of the plurality of cells.

3. The system of claim 2, wherein to select the producer remote system, the controller is further programmed to:
   receive, using the vehicle communication system, a plurality of remote occupancy grid maps from the plurality of remote systems, each of the plurality of remote occupancy grid maps including a 2D grid of a plurality of remote cells, each of the plurality of remote cells classified as at least one of a remote drivable cell, a remote undrivable cell and a remote blindspot cell;
   receive, using the vehicle communication system, a plurality of geographical locations corresponding to each of the plurality of remote systems;
   identify, for a first blindspot cell of the occupancy grid map, a plurality of potential producer remote systems with information about the first blindspot cell of the occupancy grid map, wherein the plurality of potential producer remote systems is a subset of the plurality of remote systems; and
   select the producer remote system from the plurality of potential producer remote systems to provide data for the first blindspot cell of the occupancy grid map.

4. The system of claim 3 further comprising a global navigation satellite system (GNSS) in electrical communication with the controller, wherein to identify the plurality of potential producer remote systems, the controller is further programmed to:
   determine a geographical location of the vehicle using the GNSS;
   determine a cell location for the first blindspot cell of the occupancy grid map using the geographical location of the vehicle and the set of x and y coordinates defining the first blindspot cell of the occupancy grid map;
   determine a plurality of remote cell locations for each remote drivable cell of each of the plurality of remote occupancy grid maps and each remote undrivable cell of each of the plurality of remote occupancy grid maps based on the geographical locations of each of the plurality of remote systems and the set of x and y coordinates defining each of the plurality of remote cells; and
   identify the plurality of potential producer remote systems, wherein the plurality of potential producer remote systems includes a subset of the plurality of remote systems, wherein a remote occupancy grid map of each of the plurality of potential producer remote systems includes at least one remote drivable cell or remote undrivable cell, and wherein the remote cell location of the at least one remote drivable cell or remote undrivable cell is the same as the cell location of the first blindspot cell of the occupancy grid map.

5. The system of claim 3, wherein to send the data request to the producer remote system, the controller is further programmed to:

request data from the producer remote system for at least one remote drivable cell or remote undrivable cell of a remote occupancy grid map.

6. The system of claim 3, wherein to receive data from the producer remote system, the controller is further programmed to:
receive a remote 3D point cloud from the producer remote system for at least one remote drivable or remote undriveable cell of a remote occupancy grid map.

7. The system of claim 6, wherein to generate the merged 3D point cloud, the controller is further programmed to:
calculate a time difference between a timestamp of the remote 3D point cloud and a timestamp of the initial 3D point cloud;
adjust the x, y, and z coordinates of the remote 3D point cloud based on a velocity of the producer remote system to compensate for the velocity of the producer remote system in response to determining that the time difference is less than a predetermined staleness threshold;
transform the remote 3D point cloud such that a coordinate origin of the remote 3D point cloud is the same as a coordinate origin of the initial 3D point cloud;
identify a plurality of overlapping points in the remote 3D point cloud that are expected to have the same x, y, and z coordinates as a plurality of reference points in the initial 3D point cloud based on a plurality of remote cell locations of the remote occupancy grid map from the producer remote system and a plurality of cell locations of the occupancy grid map of the vehicle;
determine a percentage of the plurality of overlapping points that have the same x, y, and z coordinates as the plurality of reference points in the initial 3D point cloud; and
combine the transformed remote 3D point cloud with the initial 3D point cloud to generate the merged 3D point cloud in response to determining that the percentage of the plurality of overlapping points having the same x, y, and z coordinates as the reference points in the initial 3D point cloud is greater than or equal to a predetermined validity threshold.

8. The system of claim 3, wherein to select the producer remote system, the controller is further programmed to:
select the producer remote system from the plurality of potential producer remote systems based at least in part on a distance between the vehicle and each of the plurality of potential producer remote systems.

9. The system of claim 1, wherein the controller is further programmed to:
continuously broadcast the occupancy grid map using the vehicle communication system.

10. The system of claim 1, wherein the controller is further programmed to:
respond to a remote data request from one of the plurality of remote systems by transmitting a 3D point cloud to the one of the plurality of remote systems using the vehicle communication system.

11. A method for sharing sensor data between a vehicle and a plurality of remote systems, the method comprising:
generating an initial 3D point cloud of an environment surrounding a vehicle using a 3D sensor, wherein each point in the initial 3D point cloud has an x, y, and z coordinate relative to the vehicle;
generating an occupancy grid map based on the initial 3D point cloud including a first blindspot;
selecting a producer remote system to provide data for the first blindspot in the occupancy grid map;
sending a data request to the producer remote system using a vehicle communication system based at least in part on the first blindspot in the occupancy grid map;
receiving data from the producer remote system including information about the first blindspot in the occupancy grid map;
generating a merged 3D point cloud by merging the data received from the producer remote system with the initial 3D point cloud; and
identifying objects in the environment surrounding the vehicle using the merged 3D point cloud.

12. The method of claim 11, wherein generating the occupancy grid map further comprises:
classifying each point in the initial 3D point cloud as a ground point or an object point based at least in part on the x, y, and z coordinate of each point;
dividing the environment surrounding the vehicle into a 2D grid of a plurality of cells, each of the plurality of cells defined by a set of x and y coordinates relative to the vehicle;
determining a quantity of ground points having x and y coordinates within the set of x and y coordinates for each of the plurality of cells in the 2D grid;
determining a quantity of object points having x and y coordinates within the set of x and y coordinates for each of the plurality of cells in the 2D grid;
classifying each of the plurality of cells in the 2D grid as a drivable cell, an undrivable cell, or a blindspot cell based at least in part on the quantity of ground points and the quantity of object points having x and y coordinates within the set of x and y coordinates for each of the plurality of cells in the 2D grid; and
defining the occupancy grid map as the 2D grid of the plurality of cells.

13. The method of claim 12, wherein classifying each of the plurality of cells in the 2D grid as a drivable cell, an undrivable cell, or a blindspot cell further comprises:
comparing the quantity of ground points in each of the plurality of cells to the quantity of object points in each of the plurality of cells;
classifying a first cell of the plurality of cells in the 2D grid as a drivable cell in response to determining that the quantity of ground points in the first cell is greater than zero and that the quantity of ground points in the first cell is greater than the quantity of object points in the first cell;
classifying a second cell of the plurality of cells in the 2D grid as an undrivable cell in response to determining that the quantity of object points in the second cell is greater than zero and that the quantity of object points in the second cell is greater than or equal to the quantity of ground points in the second cell; and
classifying a third cell of the plurality of cells in the 2D grid as a blindspot cell in response to determining that a sum of the quantity of ground points and object points having x and y coordinates within the set of x and y coordinates defining the third cell is less than or equal to a predetermined blindspot threshold.

14. The method of claim 11, wherein selecting the producer remote system further comprises:
receiving, using the vehicle communication system, a plurality of remote occupancy grid maps from the plurality of remote systems, each of the plurality of remote occupancy grid maps including a 2D grid of a plurality of remote cells, each of the plurality of remote cells classified as a remote drivable cell, a remote undrivable cell or a remote blindspot cell;

receiving, using the vehicle communication system, a plurality of geographical locations corresponding to each of the plurality of remote systems;

identifying a plurality of potential producer remote systems with information about a first blindspot cell of the occupancy grid map, wherein the plurality of potential producer remote systems is a subset of the plurality of remote systems; and selecting the producer remote system from the plurality of potential producer remote systems to provide data for the first blindspot cell of the occupancy grid map based at least in part on a distance between the vehicle and each of the plurality of potential producer remote systems.

15. The method of claim 14, wherein identifying the plurality of potential producer remote systems further comprises:

determining a geographical location of the vehicle using a global navigation satellite system (GNSS);

determining a cell location for the first blindspot cell of the occupancy grid map using the geographical location of the vehicle and a set of x and y coordinates defining the first blindspot cell of the occupancy grid map;

determining a plurality of remote cell locations for each remote drivable cell of each of the plurality of remote occupancy grid maps and each remote undrivable cell of each of the plurality of remote occupancy grid maps based on the geographical locations of each of the plurality of remote systems and a set of x and y coordinates defining each of the plurality of remote cells; and identifying the plurality of potential producer remote systems, wherein the plurality of potential producer remote systems includes a subset of the plurality of remote systems, wherein a remote occupancy grid map of each of the plurality of potential producer remote systems includes at least one remote drivable cell or remote undrivable cell, wherein the remote cell location of the at least one remote drivable cell or remote undrivable cell is the same as the cell location of the first blindspot cell of the occupancy grid map.

16. The method of claim 11, wherein receiving data from the producer remote system further comprises:

receiving a remote 3D point cloud from the producer remote system for at least one remote drivable or remote undriveable cell of a remote occupancy grid map.

17. The method of claim 16, wherein generating the merged 3D point cloud further comprises:

calculating a time difference between a timestamp of the remote 3D point cloud and a timestamp of the initial 3D point cloud;

adjusting the x, y, and z coordinates of the remote 3D point cloud based on a velocity of the producer remote system to compensate for the velocity of the producer remote system in response to determining that the time difference is less than a predetermined staleness threshold;

transforming the remote 3D point cloud such that a coordinate origin of the remote 3D point cloud is the same as a coordinate origin of the initial 3D point cloud;

identifying a plurality of overlapping points in the remote 3D point cloud that are expected to have the same x, y, and z coordinates as a plurality of reference points in the initial 3D point cloud based on a plurality of remote cell locations of the remote occupancy grid map from the producer remote system and a plurality of cell locations of the occupancy grid map of the vehicle;

determining a percentage of the plurality of overlapping points that have the same x, y, and z coordinates as the plurality of reference points in the initial 3D point cloud; and combining the transformed remote 3D point cloud with the initial 3D point cloud to generate the merged 3D point cloud in response to determining that the percentage of the plurality of overlapping points having the same x, y, and z coordinates as the reference points in the initial 3D point cloud is greater than or equal to a predetermined validity threshold.

18. A system for sharing sensor data between a vehicle and a plurality of remote systems, the system comprising:

a vehicle communication system;

a global navigation satellite system (GNSS);

a three-dimensional (3D) sensor, wherein the 3D sensor includes at least one of: a LIDAR sensor and a stereoscopic camera system; and a controller in electrical communication with the vehicle communication system, the GNSS, and the 3D sensor, wherein the controller is programmed to:

generate an initial 3D point cloud of an environment surrounding the vehicle using the 3D sensor, wherein each point in the initial 3D point cloud has an x, y, and z coordinate relative to the vehicle;

generate an occupancy grid map based on the initial 3D point cloud, wherein the occupancy grid map represents the environment surrounding the vehicle as a 2D grid of a plurality of cells, each of the plurality of cells defined by a set of x and y coordinates relative to the vehicle;

classify each of the plurality of cells in the occupancy grid map as a drivable cell, an undrivable cell, or a blindspot cell based at least in part on the x, y, and z coordinates of a plurality of points in the initial 3D point cloud having x and y coordinates within each of the plurality of cells;

select a producer remote system to provide data for a first blindspot cell in the occupancy grid map;

send a data request to the producer remote system using the vehicle communication system based at least in part on the first blindspot cell in the occupancy grid map;

receive data from the producer remote system including information about the first blindspot cell in the occupancy grid map;

generate a merged 3D point cloud by merging the data received from the producer remote system with the initial 3D point cloud; and identify objects in the environment surrounding the vehicle using the merged 3D point cloud.

19. The system of claim 18, wherein to select the producer remote system, the controller is further programmed to:

receive, using the vehicle communication system, a plurality of remote occupancy grid maps from the plurality of remote systems, each of the plurality of remote occupancy grid maps including a 2D grid of a plurality of remote cells, each of the plurality of remote cells classified as a remote drivable cell, a remote undrivable cell or a remote blindspot cell;

receive, using the vehicle communication system, a plurality of geographical locations corresponding to each of the plurality of remote systems;

determine a geographical location of the vehicle using the GNSS;

determine a cell location for the first blindspot cell of the occupancy grid map using the geographical location of the vehicle and the set of x and y coordinates defining the first blindspot cell of the occupancy grid map;

determine a plurality of remote cell locations for each remote drivable cell of each of the plurality of remote occupancy grid maps and each remote undrivable cell of each of the plurality of remote occupancy grid maps based on the geographical locations of each of the plurality of remote systems and the set of x and y coordinates defining each of the plurality of remote cells;

identify a plurality of potential producer remote systems, wherein the plurality of potential producer remote systems includes a subset of the plurality of remote systems, wherein the remote occupancy grid map of each of the plurality of potential producer remote systems includes at least one remote drivable cell or remote undrivable cell, wherein the remote cell location of the at least one remote drivable cell or remote undrivable cell is the same as the cell location of the first blindspot cell of the occupancy grid map; and select the producer remote system from the plurality of potential producer remote systems based at least in part on a distance between the vehicle and each of the plurality of potential producer remote systems.

20. The system of claim 18, the system further comprising a human machine interface (HMI), and wherein the controller is further programmed to:

provide a visual representation of the merged 3D point cloud to an occupant of the vehicle using the HMI.

\* \* \* \* \*